Patented Oct. 21, 1924.

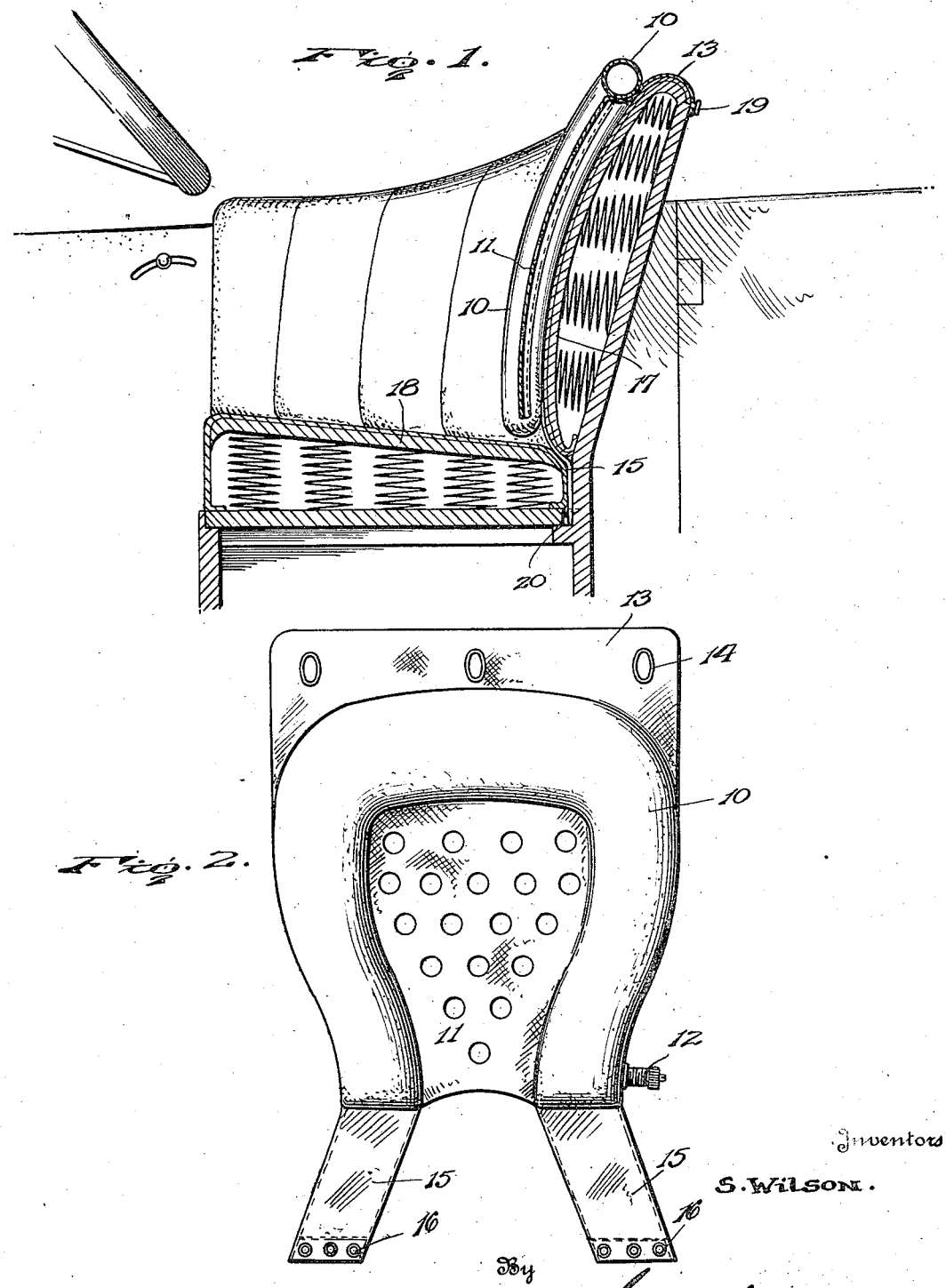

1,512,260

UNITED STATES PATENT OFFICE.

SHERMAN WILSON, OF MARIANNA, FLORIDA, ASSIGNOR OF ONE-HALF TO JAS. A. GRIFFIN, OF MARIANNA, FLORIDA.

BACK REST FOR VEHICLE SEATS.

Application filed May 2, 1923. Serial No. 636,161.

*To all whom it may concern:*

Be it known that I, SHERMAN WILSON, citizen of the United States, residing at Marianna, in the county of Jackson and State of Florida, have invented certain new and useful Improvements in Back Rests for Vehicle Seats, of which the following is a specification.

This invention relates to an improved back rest for motor vehicle seats, being particularly designed for use in connection with the driver's seat of a vehicle and seeks, among other objects, to provide a device which may be readily secured upon the back of a seat to form a cushion for the back of the driver.

The invention seeks, as a further object, to provide a device of this character embodying a pneumatic cushion and wherein the cushion may be readily inflated or deflated as desired.

And the invention seeks, as a still further object, to provide a device wherein the cushion will be shaped to brace and sustain the back of the driver while protecting the clothes of the driver against soiling by the back of the seat.

Other and incidental objects will appear hereinafter.

In the drawings:

Figure 1 is a sectional view showing my improved device applied to a conventional automobile seat, and Figure 2 is a detail front elevation of the device.

In carrying the invention into effect, I employ a pneumatic tube 10, the end portions of which are, as shown in Figure 2, turned laterally in like direction and connecting the end portions of the tube with each other as well as with the intermediate portion of the tube is a central web 11 lying in a plane medially of the tube and cooperating with the tube to form a cushion of inverted substantially U-shape. However, as will be seen, the side portions of the cushion, which side portions are formed by the end portions of the tube, are gradually curved inwardly toward each other as said side portions approach the bottom of the cushion. This is done so that the cushion will better fit the back of the user and so that the side portions of the cushion will extend downwardly along the back at the sides of the user for bracing the back. The web 11 may be formed integral with the tube or may be appropriately attached thereto and, for the purpose of ventilation, may be provided with a number of openings therein. Extending from the tube near one end thereof is an appropriate inflation valve 12 through which the tube may be inflated with air at the desired pressure. Suitably connected to the tube 10 of the cushion at the top of said cushion is a securing flap 13 equipped with a plurality of eyelets 14 and similarly secured to the ends of the tube at the bottom of the cushion are companion diverging securing straps 15 which may also each be provided with a plurality of eyelets 16.

Referring now to Figure 1 of the drawings, I have illustrated my improved cushion in connection with the driver's seat of a conventional motor vehicle, the back cushion of the seat being indicated at 17 and the bottom cushion thereof at 18. As will be observed, the back rest is arranged to overlie the back cushion 17 while the flap 13 is of a length to extend over the back of the seat at its upper edge, and mounted upon the back of the seat are studs or other approved fastening devices 19 accommodating the eyelets 14 of said flap thereover suspending the back rest in position. If preferred, the flap may be tacked to the back of the seat or may be buttoned thereto. The straps 15 at the lower end of the back rest are of a length to extend downwardly behind the bottom cushion 18 and mounted upon the back of the seat are studs or other suitable fastening devices 20 accommodating the eyelets 16 of the straps thereover so that the studs will thus function to secure the straps and hold the back rest against lateral movement as well as outward movement away from the back cushion 17. If preferred, the straps 15, like the flap 13, may be tacked or buttoned to the back of the seat. Thus, it will be seen that the back rest may be readily secured in place while the cushion provided by the back rest will be disposed to receive and support the back of the driver. Furthermore, the cushion will serve to protect the clothing of the driver against soiling by the upholstery of the back cushion 17.

Having thus described the invention, what is claimed as new is:

The combination with a vehicle seat including a back and a bottom, of a pneumatic tube of inverted U-shape adapted to rest against the seat back from the top thereof to the seat bottom, a web connecting the side portions of the tube, a securing flap attached to the top transverse member of the tube and coterminous therewith and extending therefrom over the back of the seat to be secured on the rear side thereof, and straps attached to the ends of the tube and extending therefrom to pass between the lower edge of the seat back and the rear edge of the seat bottom and be secured at the rear of the bottom below the back.

In testimony whereof I affix my signature.

SHERMAN WILSON. [L. S.]